US008949125B1

(12) United States Patent
Chechik

(10) Patent No.: US 8,949,125 B1
(45) Date of Patent: Feb. 3, 2015

(54) ANNOTATING MAPS WITH USER-CONTRIBUTED PRONUNCIATIONS

(75) Inventor: Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1062 days.

(21) Appl. No.: 12/816,563

(22) Filed: Jun. 16, 2010

(51) Int. Cl.
*G10L 15/00* (2013.01)
*G10L 21/00* (2013.01)
*G08G 1/123* (2006.01)
*G06F 7/00* (2006.01)
*G06F 17/00* (2006.01)

(52) U.S. Cl.
USPC ........... 704/243; 704/209; 704/249; 704/256; 704/235; 704/270; 707/748; 701/235; 701/412; 715/209

(58) Field of Classification Search
USPC ............. 704/209, 243, 249, 246, 256, 251, 9, 704/235, 270, 252, 244, 233, 234, 221, 704/231; 707/503; 701/211, 208, 532, 429; 715/209; 700/1
See application file for complete search history.

(56) References Cited

U.S. PATENT DOCUMENTS

| | | | | |
|---|---|---|---|---|
| 6,505,152 | B1 * | 1/2003 | Acero | 704/209 |
| 6,868,381 | B1 * | 3/2005 | Peters et al. | 704/249 |
| 7,590,533 | B2 * | 9/2009 | Hwang | 704/231 |
| 8,185,392 | B1 * | 5/2012 | Strope et al. | 704/252 |
| 8,577,681 | B2 * | 11/2013 | Roth et al. | 704/244 |
| 2002/0069220 | A1 * | 6/2002 | Tran | 707/503 |
| 2004/0117181 | A1 * | 6/2004 | Morii et al. | 704/234 |
| 2004/0240633 | A1 * | 12/2004 | Sloan | 379/88.16 |
| 2005/0075875 | A1 * | 4/2005 | Shozakai et al. | 704/231 |
| 2006/0064177 | A1 * | 3/2006 | Tian et al. | 700/1 |
| 2006/0074657 | A1 * | 4/2006 | Huang | 704/246 |
| 2006/0106604 | A1 * | 5/2006 | Okimoto | 704/243 |
| 2006/0206331 | A1 * | 9/2006 | Hennecke et al. | 704/254 |
| 2007/0078598 | A1 * | 4/2007 | Watanabe et al. | 701/211 |
| 2007/0118279 | A1 * | 5/2007 | Kudo | 701/208 |
| 2007/0118374 | A1 * | 5/2007 | Wise et al. | 704/235 |
| 2007/0294082 | A1 * | 12/2007 | Jouvet et al. | 704/231 |
| 2008/0027723 | A1 * | 1/2008 | Reding et al. | 704/231 |
| 2008/0059185 | A1 * | 3/2008 | Chung et al. | 704/256 |
| 2008/0133220 | A1 * | 6/2008 | Paek et al. | 704/9 |
| 2008/0208574 | A1 * | 8/2008 | Chen et al. | 704/221 |
| 2008/0288252 | A1 * | 11/2008 | Cerra et al. | 704/244 |
| 2009/0125309 | A1 * | 5/2009 | Tischer | 704/260 |

(Continued)

OTHER PUBLICATIONS

Jean-Luc Gauvain and Chin-Hui Lee, Maximum A Posteriori Estimation for Multivariate Gaussian Mixture Observations of Markov Chains, IEEE Transactions on Speech and Audio Processing, vol. 2, No. 2, Apr. 1994, pp. 1-16.

(Continued)

*Primary Examiner* — Paras D Shah
*Assistant Examiner* — Neeraj Sharma
(74) *Attorney, Agent, or Firm* — Lerner, David, Littenberg, Krumholz & Mentlik, LLP

(57) ABSTRACT

Systems and methods are provided to select a most typical pronunciation of a location name on a map from a plurality of user pronunciations. A server generates a reference speech model based on user pronunciations, compares the user pronunciations with the speech model and selects a pronunciation based on comparison. Alternatively, the server compares the distance between one the user pronunciations and every other user pronunciations and selects a pronunciation based on comparison. The server then annotates the map with the selected pronunciation and provides the audio output of the location name to a user device upon a user's request.

25 Claims, 8 Drawing Sheets

(56) References Cited

U.S. PATENT DOCUMENTS

| | | | |
|---|---|---|---|
| 2009/0182559 A1* | 7/2009 | Gerl et al. | 704/235 |
| 2010/0049518 A1* | 2/2010 | Ferrieux | 704/254 |
| 2010/0076764 A1* | 3/2010 | Chengalvarayan | 704/251 |
| 2010/0185448 A1* | 7/2010 | Meisel | 704/256.1 |
| 2010/0332230 A1* | 12/2010 | Shu | 704/253 |

OTHER PUBLICATIONS

C.J. Leggetter and P.C. Woodland, Maximum Likelihood Linear Regression for Speaker Adaptation of Continuous Density Hidden Markov Models, Computer Speech and Language (1995), pp. 1-22.

\* cited by examiner

ANNOTATING MAPS WITH USER-CONTRIBUTED PRONUNCIATIONS

BACKGROUND OF THE INVENTION

1. Field of the Invention

The present invention relates to methods and systems for selecting a typical pronunciation of a location name from user-contributed sound recordings and annotating a mapping application with the selected pronunciation.

2. Description of Related Art

When using web-based mapping applications and other location-related services, it is often very hard to pronounce the names of locations, like city names, street names, or even public locations, given the text alone. This may be especially difficult when traveling in a foreign country. The audio sounds of some geographical locations are now available on the Internet and commercial GPS systems. For instance, some locations have had their recorded names uploaded on the Internet, e.g., on the wikimedia website. Some commercial databases also store the audio files of location names. These existing systems may not properly pronounce the location names, and may not provide robust solutions for handling a variety of geographical locations. Moreover, the coverage of these databases might be very partial, providing mainly the most popular locations worldwide.

SUMMARY OF THE INVENTION

Aspects of the invention provide map applications that allow users to upload their own sound recordings that are associated with a location on a map, and to select a sound recording from the multitude of uploaded recordings.

In one embodiment of the invention, a method of selecting a user spoken utterance is provided. The method comprises receiving a set of user spoken utterances corresponding with a text string at a processing device, and generating a speech model based on the text string and the received user spoken utterances based on the text string at the processing device. The method also comprises comparing the generated speech model to each received user spoken utterance, selecting one of the received user spoken utterances based on a similarity of a given one of the received user spoken utterances to the generated speech model, and providing audio information to a user device based on the selected user spoken utterance.

In one example, generating a speech model based on the text string and the user spoken utterances includes obtaining a Hidden Markov Model of the text.

In another example, obtaining the Hidden Markov Model of the text includes training a set of phoneme Hidden Markov Models with speech data.

In a further example, generating the speech model based on the text string and the user spoken utterances comprises adapting a generic speech model with the received set of user spoken utterances of the text string.

In one alternative, adapting the generic speech model comprises adapting by Maximum A-Posteriori Estimation with the set of user spoken utterance of the text string.

In another alternative, adapting the generic speech model includes adapting by Maximum Likelihood Linear Regression with the set of user spoken utterances of the text.

In accordance with another embodiment, a method of selecting a user spoken utterance comprises receiving a plurality of user spoken utterances corresponding to a text string at a processing device. The processing device performs generating a speech model for each received user spoken utterance, measuring a distance value between each of the generated speech models and every other generated speech models, and selecting a given one of the user spoken utterances based on the measured distance. The method also comprises providing audible output of the text string based on the selected user spoken utterance.

In one alternative, the speech model is a Hidden Markov Model.

In another alternative, the distance value is a minimum edit distance.

In accordance with a further embodiment, a method of providing audible output of a location name on electronically generated map is provided. The method comprises receiving a plurality of user spoken utterances of the location name at a processing device. The processing device selects one of the user spoken utterances based on acoustic features of each of the plurality of user spoken utterances. The method also comprises providing audio output of the location name to a user device based on the selected user spoken utterance.

In one example, selecting one of the user spoken utterances includes generating a speech model for each spoken utterance of the plurality of user spoken utterances, and measuring a distance value between one of the generated speech models and every other generated speech models. Selecting one of the plurality of user spoken utterances is based on the measured distance value.

In another example, the speech model is a Hidden Markov Model.

In a further example, the distance value is a minimum edit distance.

In one alternative, selecting one of the user spoken utterances includes generating a speech model based on the location name and the plurality of user spoken utterances, and comparing the generated speech model to each of the plurality of user spoken utterances. Selecting one of the user spoken utterances is based on a similarity of a given one of the user spoken utterances to the generated speech model.

In another alternative, generating a speech model includes generating a Hidden Markov Model of the location name.

In a further alternative, generating a speech model includes adapting a generic speech model by Maximum A-Posteriori Estimation or Maximum Likelihood Linear Regression with the plurality of user spoken utterances.

In accordance with another embodiment, a server apparatus for providing audible data to user devices on a network comprises a memory for storing information including map information and a processor operatively coupled to the memory. The processor is configured to receive a plurality of user spoken utterances of a location name, to select one of the user spoken utterances from the plurality of user spoken utterances, and to provide audio output of the location name to a user device based on the selected user spoken utterance.

In one example, the processor is further configured to generate a speech model based on the location name and the plurality of user spoken utterances, to compare the generated speech model to each of the received user spoken utterances; and to select a given one of the user spoken utterances based on a similarity of a given one of the user spoken utterance to the generated speech model.

In another example, the generated speech model is a Hidden Markov Model.

In a further example, the processor is further configured to adapt a generic speech model by Maximum A-Posteriori Estimation or Maximum Likelihood Linear Regression with the plurality of user spoken utterances.

In one alternative, the processor is further configured to generate a speech model for each of the plurality of user spoken utterances, and to measure a distance value between one of the generated speech models and every other generated speech model. The user spoken utterance is selected based on the measured distance value.

In another alternative, the generated speech model is a Hidden Markov Model.

In a further alternative, wherein the distance value is a minimum edit distance.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, systems and methods are provided to select a typical pronunciation of a location name on a map from a set of user-contributed pronunciations of the location name, and annotate the map with the selected pronunciation. For example, the system may allow users to upload sound recordings of a particular location name on a map and then the system may select a most typical pronunciation from the uploaded recordings. The selected pronunciation may then be associated with the location name on the map and be provided to users in an audible format upon request.

In one embodiment, the system generates an initial speech model of a location name. A set of user pronunciations of the location name is used to adapt the speech model. The adapted model thus catches the acoustic characteristics of a typical pronunciation of the location name. Then, the adapted model is used to score uploaded pronunciations. The pronunciation with the highest score is desirably selected as the most typical pronunciation.

Alternatively, the system may generate a most likely sequence of HMM (Hidden Markov Model) states for each uploaded user pronunciation of a location name. Then a distance between each pair of sequences is calculated. The sequence with the shortest average distance from all the other sequences may be selected as the most typical pronunciation of the location name.

Figure 1:
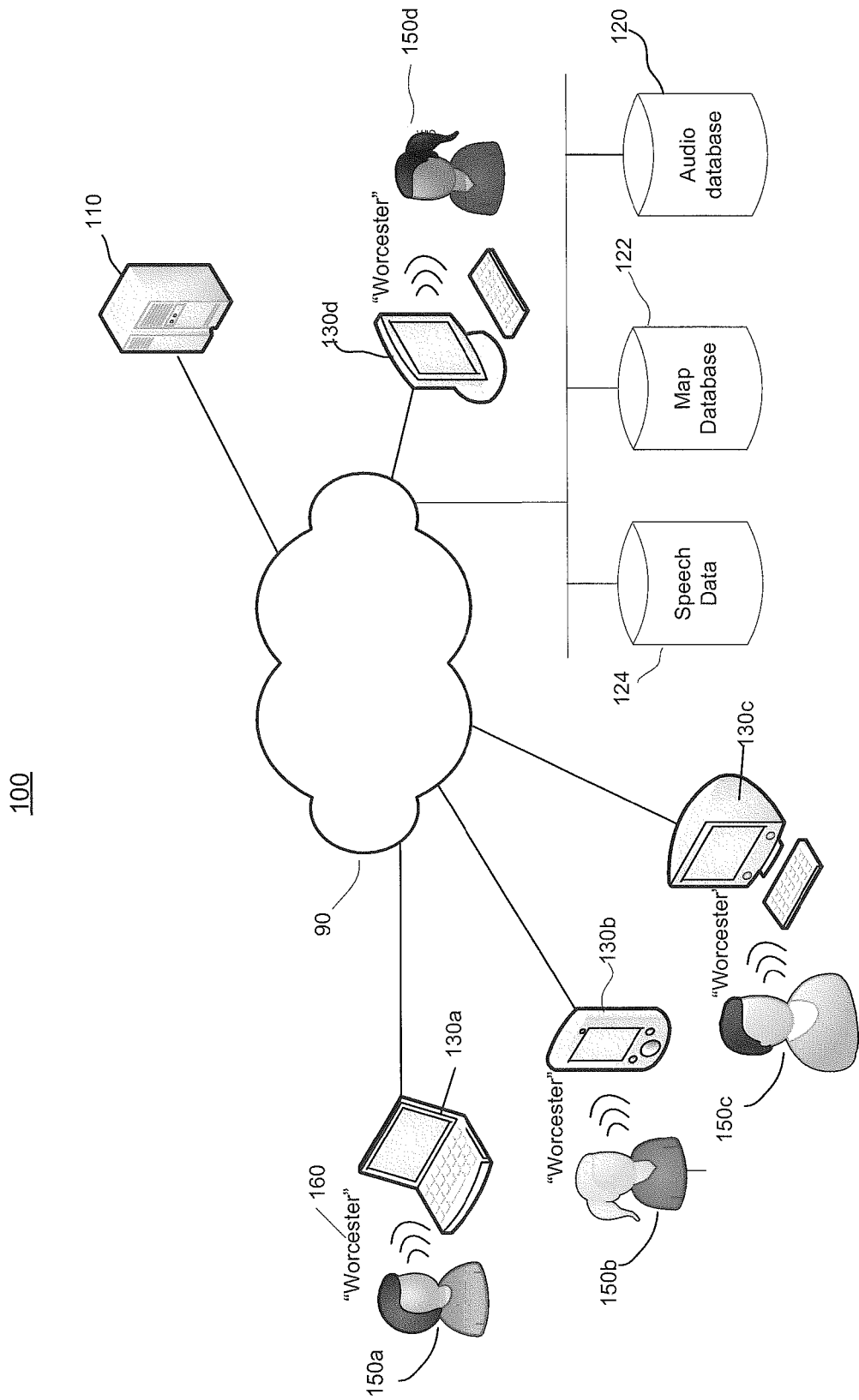
FIG. 1 is a pictorial diagram of a system in accordance with aspects of the invention.

As shown in FIG. 1, a system 100 in accordance with one aspect of the invention includes a computer 110 and a plurality of user devices 130a-130d. The computer 110 may be a server and connected to a plurality of distributed databases 120 and 124 through a network 90. The distributed databases may store various types of data such as speech data, map data and audio data associated with the map.

In an example illustrated by FIG. 1, users such as 150a-150c may upload their pronunciations of a location name such as "Worcester" onto the server 110. A typical pronunciation of this location name may be selected by the server and be associated with the location "Worcester" on a map application. The audio data of the typical pronunciation may be stored in the server or in a distributed database, such as the audio database 120, and may be provided through user device 130d to user 150d when, for example, she clicks on the location "Worcester" on a map.

Figure 2:
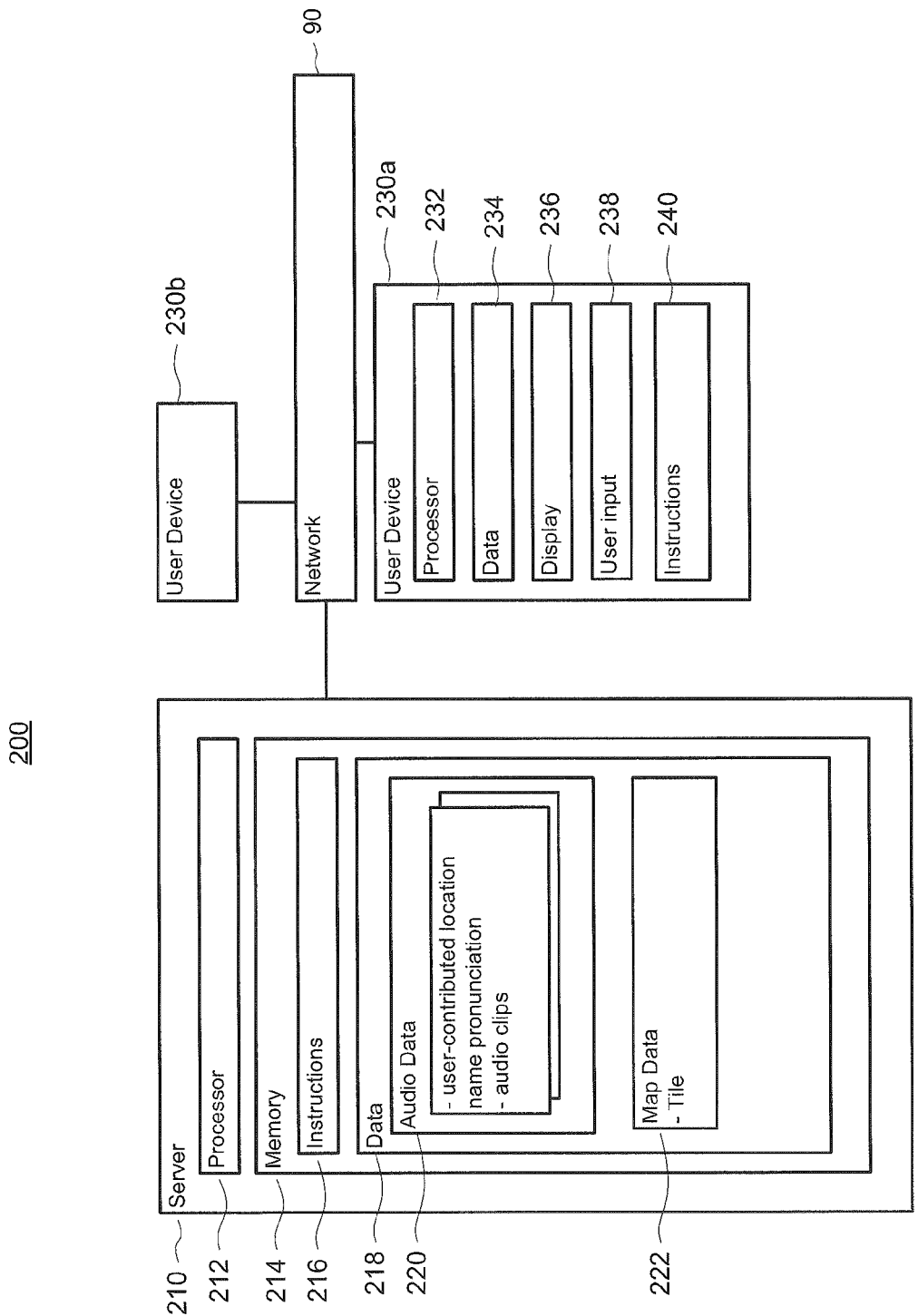
FIG. 2 is a functional diagram of a system in accordance with aspects of the invention.

FIG. 2 illustrates that server 210 may contain a processor 212, memory 214 and other components typically present in general purpose computers. The processor 212 may be any off-the-shelf processor, such as processors from Intel Corporation or AMD. Alternatively, the processor may be a dedicated controller such as an ASIC.

Memory 214 stores information accessible by processor 212, including instructions 216 that may be executed by the processor 212 and data 218. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. There may be different combinations of the foregoing, whereby different portions of the instructions and data are stored on different types of media.

The instructions 216 may be any set of instructions to be executed directly (such as binary machine code) or indirectly (such as scripts from any programming language) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance.

Data 218 may be retrieved, stored or modified by processor 212 in accordance with the instructions 216. For instance, although the system and method is not limited by any particular data structure, the data may be stored in computer registers, in a relational database as a table having a plurality of different fields and records, XML documents, etc. The data may comprise any information sufficient to identify the relevant information, such as numbers, descriptive text, proprietary codes, references to data stored in other areas of the same memory or different memories (including other network locations) or information that is used by a function to calculate the relevant data.

Although FIG. 2 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 210 may be at one node of network 90 and capable of directly and indirectly communicating with other nodes of the network. For example, computer 210 may comprise a web server that is capable of communicating with user devices 230a-230b via the network 90 such that server 210 uses network 90 to transmit and provide information to a user using the user device 230a. Server 210 may also comprise a plurality of computers that exchange information with different nodes of a network for the purpose of receiving, processing and transmitting data to the user devices; in this instance, the user devices will typically still be at different nodes of the network than any of the computers comprising server 210.

Network 90, and intervening nodes between server 210 and user devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few devices are depicted in FIGS. 1-2, it should be appreciated that a typical system can include a large number of connected computers.

Each client device may be configured similarly to the server 210, with a processor 232, memory and instructions 240. Each client device 230a or 230b may be a device intended for use by a person 150a or 150b, and have all of the components normally used in connection with a computer such as a central processing unit (CPU), memory (e.g., RAM and internal hard drives) storing data and instructions such as a web browser, an electronic display 236 (e.g., a monitor having a screen, a small LCD touch-screen, a projector, a television, a computer printer or any other electrical device that is operable to display information), and user input 138 (e.g., a mouse, keyboard, touch-screen and/or microphone). The client device may also include a GPS receiver, speakers, a network interface device, as well as all of the components used for connecting these elements to one another.

Although the client devices 130a-130d and 230a-230b may each comprise a full-sized personal computer, they may alternatively comprise mobile devices capable of wirelessly exchanging data with a server over a network such as the Internet. By way of example only, client device 130b may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, client devices in accordance with the systems and methods described herein may comprise any device capable of processing instructions and transmitting data to and from humans and other computers.

Although certain advantages are obtained when information is transmitted or received as noted above, other aspects of the system and method are not limited to any particular manner of transmission of information. Yet further, although some functions are indicated as taking place on a server and others on a user device, various aspects of the system and method may be implemented by a single computer having a single processor.

Server 210 may also store map-related information 222, at least a portion of which may be transmitted to a user device. For example, the server may store map tiles, where each tile is a map image of a particular geographic area. A single tile may cover an entire region such as a state in relatively little detail and another tile may cover just one or a few streets in high detail. Yet another tile may cover a building, street or a point of interest at a particular location at a highest resolution.

The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the server 210 is capable of selecting, retrieving and transmitting one or more tiles in response to receiving a geographical location from a user device.

The server may also store audio data 220 associated with the map, for example, pronunciation of a point of interest or a location name, or one or more audio clips associated with the particular location or a point of interest. The audio data is not limited to any particular format.

As shown in FIGS. 1 and 2, the databases 120-124 storing the audio data, map data, and the speech data may be residing on the same server. In another example, these databases may reside on distributed servers which may be on different nodes of network 90.

Operations in accordance with aspects of the invention will now be described. It should be understood that the following operations do not have to be performed in the precise order described below. Rather, various operations can be handled in reverse order or simultaneously.

Figure 3:
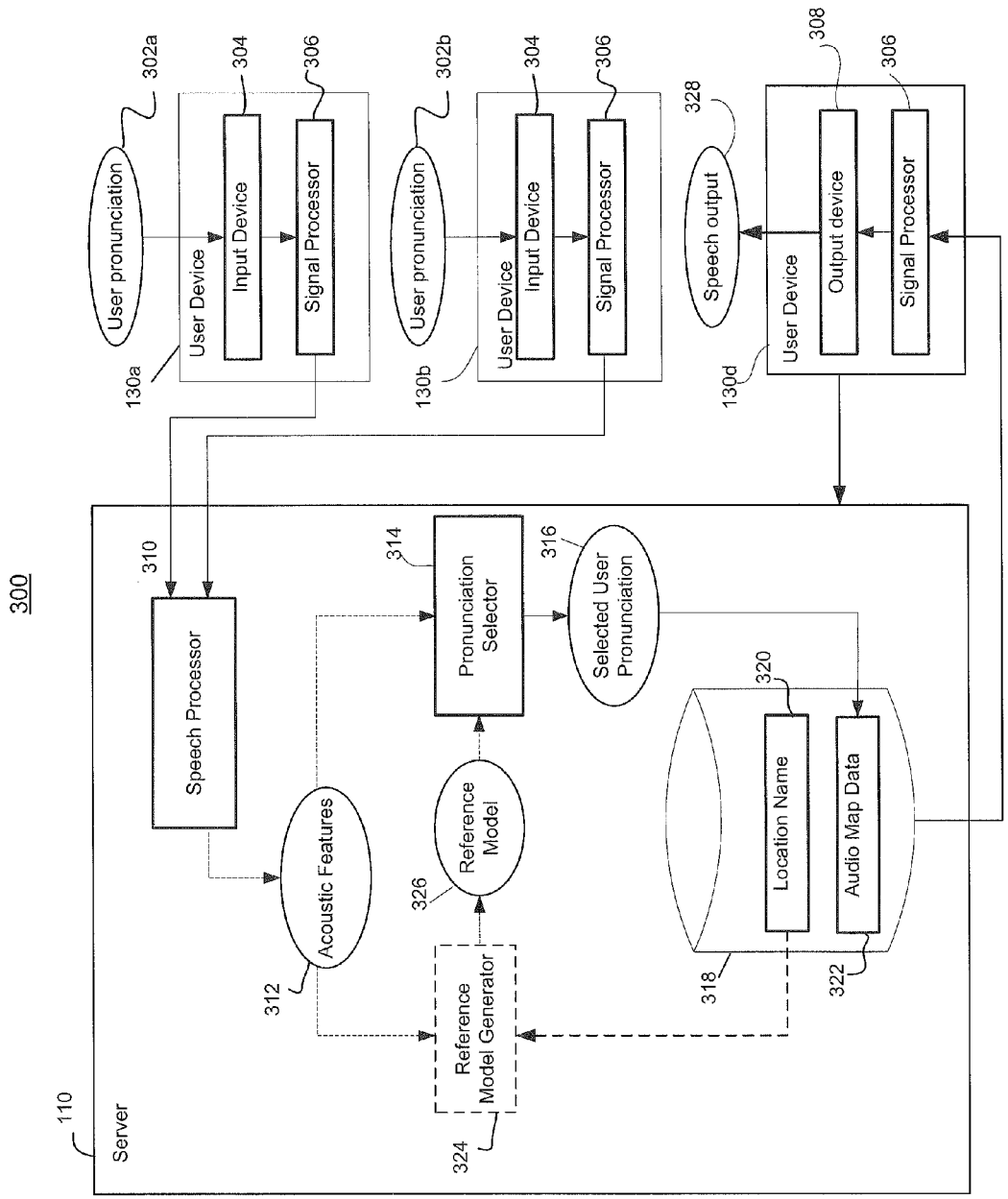
FIG. 3 is a functional diagram in accordance with aspects of the invention.

FIG. 3 illustrates an embodiment 300 for receiving and selecting user pronunciations in accordance with aspects of the invention. An input device 304 associated with user device 130a receives speech input of a user pronunciation 302a of a location name on the map displayed on the user device. In one example, the speech input device may include a microphone. The input speech signal is processed by a signal processor 306 associated with the user device. For example, the analog speech input may be coded, by an A/D speech converter and an encoder in the user device, into digitized speech signal to be transmitted to the server 110.

A speech processor 310, preferably located at server 110, may be used to process the received user speech data from the user devices 302a-b. In one embodiment, the speech processor 310 may perform feature extraction functions to extract acoustic features 312 from the received digital speech signal. For example, the speech processor may first divide the speech signal into a sequence of frames, where each frame may be represented by a feature vector describing the average spectrum for the time interval of a frame. Then, each section of signal may be multiplied by a tapered window with a length on the order of about 20-25 ms, such as a Hamming window or Hanning window. Then the speech processor 310 may perform various types of frequency analysis such as a series of Fourier transforms through filter banks, cepstral analysis, linear predictive analysis to obtain mel-frequency cepstrum coefficients ("MFCCs") or linear predictive coefficients. The feature extractor may also perform perceptual linear predictive analysis. Every frame of the digitized speech signal may be associated with a multi-dimension feature vector of various acoustic features.

The speech processor 310 may also perform dynamic feature extractions to augment the obtained set of static acoustic features, such as MFCCs, with measurements of the change in the static feature, such as time derivatives or deltas. In other aspects of the invention, the speech processor 310 may include any other speech analysis and processing functions and techniques.

As to be discussed in later sections, various methods and techniques of selecting a most common pronunciation may be used. FIG. 3 illustrates two alternatives of selecting a typical pronunciation at the server 110. It should be noted that these alternatives may be, either alone or in combination, implemented on server 110 and be used to select a pronunciation.

In a first alternative, the extracted acoustic features 312 of the user pronunciations are input to a reference model generator 324 on the server 110 to generate a reference model 326. As to be discussed in details later, this process may further involve generating a generic speech model and adapting the generic speech model with a set of user pronunciations of a specific location name. For example, the model could be adapted such that the contributed pronunciations become more likely according to the adapted model. The adapted reference model 326 may then be used as a selection criterion by the pronunciation selector 314 to score each of the user pronunciation in the given set of user pronunciations that are used to obtain the adapted reference model 326. The pronunciation selector then selects the user pronunciation with the highest score (316) as the most typical pronunciation of that specific location name. For example, the score could be the likelihood of a contributed pronunciation given the adapted model.

In a second alternative, the acoustic features 312 of each user pronunciation may be input directly into the pronunciation selector 314. The pronunciation selector 314 may compare the acoustic features of each user pronunciation to the features of every other pronunciation. This embodiment may comprise generating an HMM sequence of states for each user pronunciation of a location name, comparing the distance between two sequences and selecting the sequence having the shortest average distance to the rest of the pronunciations. For example, an approach for computing the distance between two state sequences is to use an "edit distance". This distance may be obtained by measuring the number of edit operations (including, e.g., inserting a state to a sequence, deleting a state from a sequence and/or replacing one state by another state, etc.) that are needed to transform one sequence into another sequence.

A pronunciation selection system may be configured to select one of these two exemplary alternatives to be used on the basis of a variety of factors such as the sufficiency of speech data used to train a speech data. When there is abundant training data and a generic speech model may be easily trained, the first alternative may be a more useful pronunciation selection method. The second alternative may work better in the situations where training data is sparse and a generic speech model cannot be obtained efficiently, for example, geographical areas that have less popular language. A pronunciation selection system may also be configured to select user-contributed pronunciations using both alternatives, and assign weights to the results of the two alternatives based on the above-mentioned or otherwise chosen factors.

The selected user pronunciation 316 may then be stored in an audio database 122 (as shown in FIG. 1), or may be stored on the server 110. Upon request, e.g., a user's click on the location on a map in a browser application, the audio sound of the location name may be transmitted to a user device, such as device 130*d*. The user may also be allowed to request for an audible output of the location name through clicking on an image or any other object associated with the location shown on the map in the browser application.

At the user device, the received digital speech data from the server is processed by the signal processor 306 and provided to the user through an output device 308, such as a speaker. Thus, the user is able to hear the pronunciation 328 of the location that she clicks on the map.

Figure 4A:
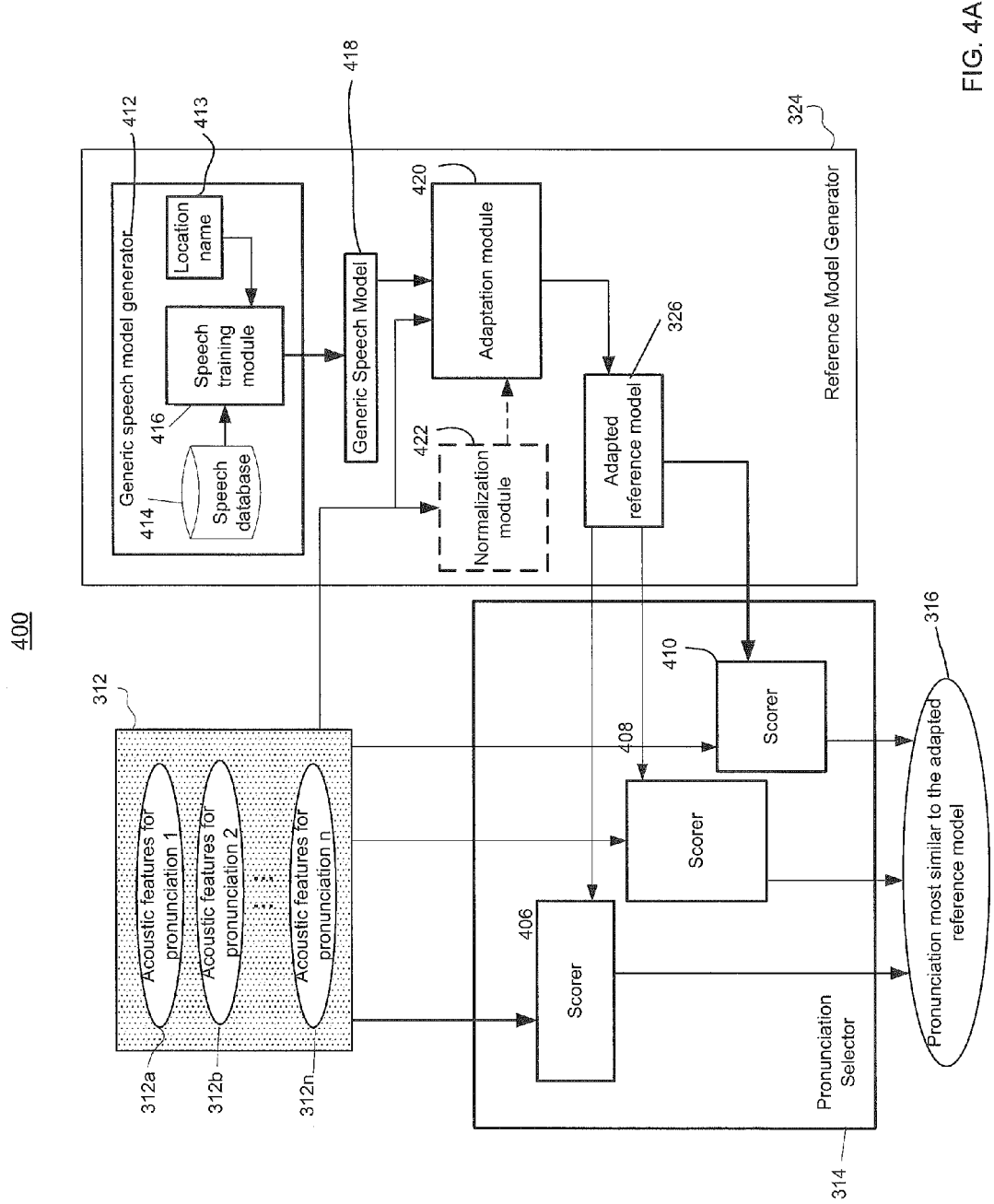
FIGS. 4A-B are functional diagrams in accordance with aspects of the invention.

Turning to FIG. 4A, the system diagram 400 depicts one aspect of the invention where user pronunciation selection is based on comparison with a reference speech model. The reference model generator 324 may include a generic speech model generator 412, which may be used to obtain a generic speech model 418. In one embodiment of the invention, the generic speech model generator 412 may be a HMM generator and the generic speech model obtained is a generic HMM.

In one example of the generic speech model generator 412, spectral parameters and pitch observations (e.g., mel-cepstral coefficients, logarithm of fundamental frequency, etc.) may be extracted from a speech database 414 with a large speech data corpus. These parameters are used to train a generic phoneme HMM by a training module 416. Phonetic and linguistic contextual factors can be taken into account to model variations of spectrum and pitch of a particular phoneme. State durations of HMMs can be modeled by multi-dimensional Gaussian distributions and state clustering methods. When contextual factors are used, the model of a particular phoneme may depend on the short sequences of phonemes around it.

It should be noted that the generic speech model generator is not limited to generating a phoneme-based model. Other language-unit based models may be obtained. In one alternative, a syllable-based models may be generated.

In another alternative, an HMM could be trained directly on the whole word data known to be location names in the speech database. In another alternative, the generic speech model generator may also be a HMM based text-to-speech generator, so the generic speech model may be generated on the basis of the location name and the speech data. A text analyzer (not shown) may be employed to process a corresponding text of a location name 413 and provide parameters needed to obtain an initial reference model, such as phonetic transcription and contextual parameters.

The reference model generator 324 may further comprise an adaptation module 420 to adapt the trained generic speech model 418 with a set of user pronunciations 312*a*-312*n*. This may be implemented using Maximum A-Posteriori Estimation ("MAP") or Maximum Likelihood Linear Regression ("MLLR"). By providing a set of user pronunciations 312*a*-312*n* to the adaption unit 420, MAP may be used to obtain a posteriori estimation for mulitvariate Gaussian mixture state observation densities s of the generic Markov model. The MLLR adaptation may be used to adapt each state of the generic HMM chain and update the generic HMM chain's mean parameters to maximize the likelihood of the adaptation data, while leaving the other parameters of the HMM chain unchanged. By adapting the generic speech model with a given set of user pronunciations of a particular location name, the characteristics of the given set of pronunciations are thus "caught" in the adapted reference model 326.

As the pronunciations uploaded by the users may come from a large variety of speaker pools, the pronunciations may have vary greatly in the vocal track length. Thus, one or more normalization modules, such as the normalization module 422, may be used to normalize the user-contributed pronunciations and reduce the vocal tract length effect before these pronunciations are used to adapt the generic speech model.

The adapted reference speech model 326 may then be utilized by the pronunciation selector 314 to score each of the user pronunciations 312*a*-312*n*. Various acoustic features comparison methods, such as those shown in FIGS. 4A-B, may be used. Thus, the pronunciation selector 314 may incorporate any or any combinations of the available pronunciation scoring techniques (for example, scorer 406 may perform phoneme segment duration scoring, scorer 408 may perform phoneme log-posterior probability scoring and scorer 410 may perform a phoneme log-likelihood scoring) to measure the similarity between the respective segment units of the adapted speech model 326 and the segment units of a user-contributed speech data 312*a*-312*n*.

Figure 4B:
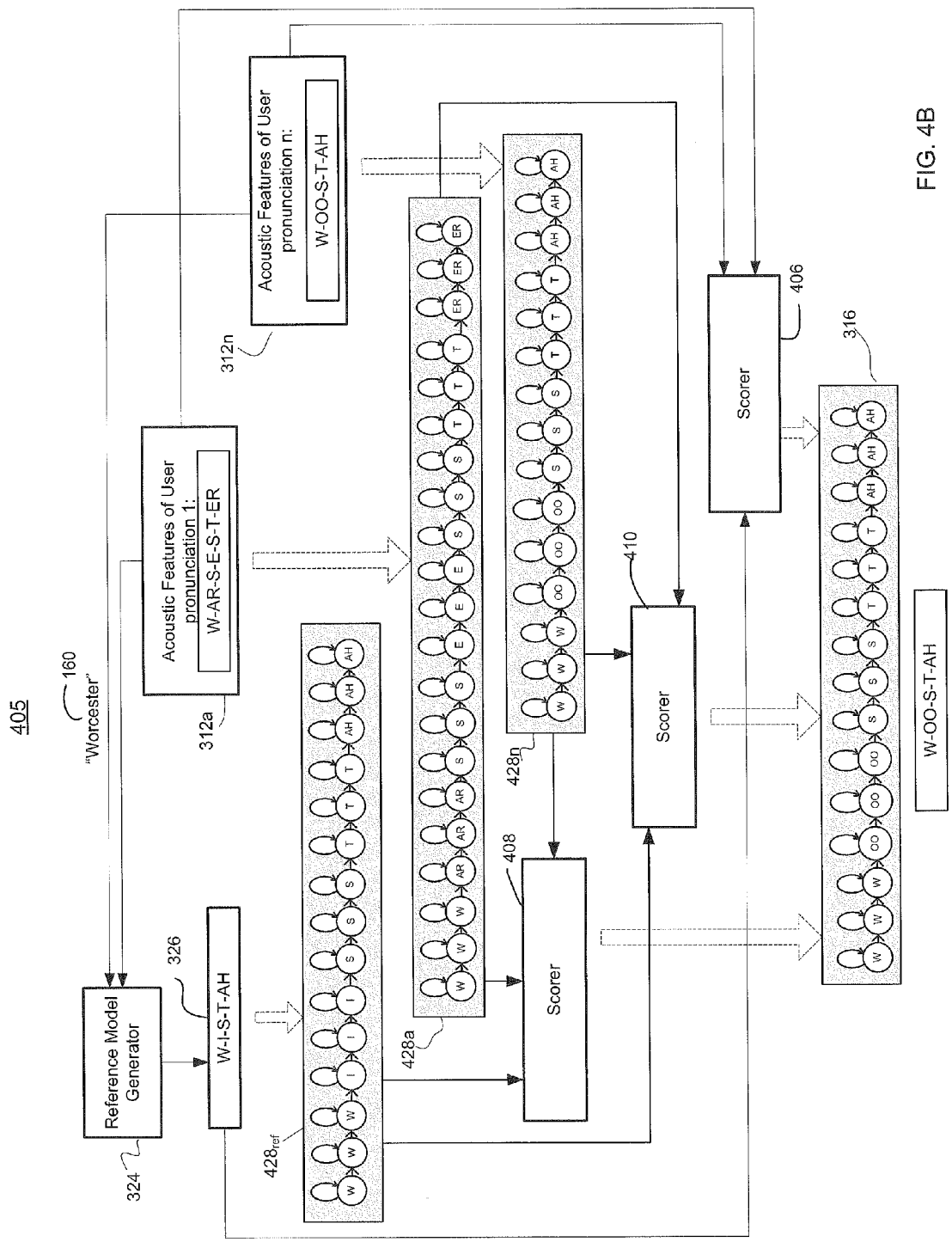

For instance, as shown in FIGS. 4A-B, phoneme log-likelihood and phoneme log-posterior probability scores may be computed by scorers 408 and 410 to compare the HMM sequences 428*a*-428*n* of the user pronunciations and the reference HMM 428$_{ref}$. An HMM for each user pronunciation may be generated by an HMM speech model generator. In this example, each HMM is a sequence of discrete states, and each state is associated with three probability density functions:

probabilities of observing a feature vector, prior probabilities of starting in a particular state, and transition probabilities. The transitions between states could be for a language unit with the size of phoneme, diphone, triphone, syllable or word. For example, FIG. 4B illustrates three phoneme HMMs for three different pronunciations. For each phonetic segment of the speech data, the corresponding log likelihood of the spectral observations extracted may be obtained.

Another comparison approach may involve calculating an average posterior probability score, where the average log likelihood of each frame in each phoneme segment is used.

A phoneme segment duration scorer 406 may be used to compute a duration score for each HMM sequence of user pronunciation by comparing the duration differences between the phoneme segment of the user pronunciation and the adapted speech model 326. For example, the duration of a phoneme level segment may be computed by first measuring the duration in frames for the i-th segment from a Viterbi phonetic alignment, then normalizing the calculated value to compensate for the speech rate, and finally calculating the log-probability of the normalized value by using a discrete distribution of durations for the corresponding phoneme.

In one aspect, different scores from the different scorers may be given the same weights in selecting a pronunciation. In another aspect, different scores may be given different weights in the selection. A pronunciation 316 that has the highest correlation to the adapted speech model is thus selected as the most typical pronunciation of a particular location name.

Figure 5A:
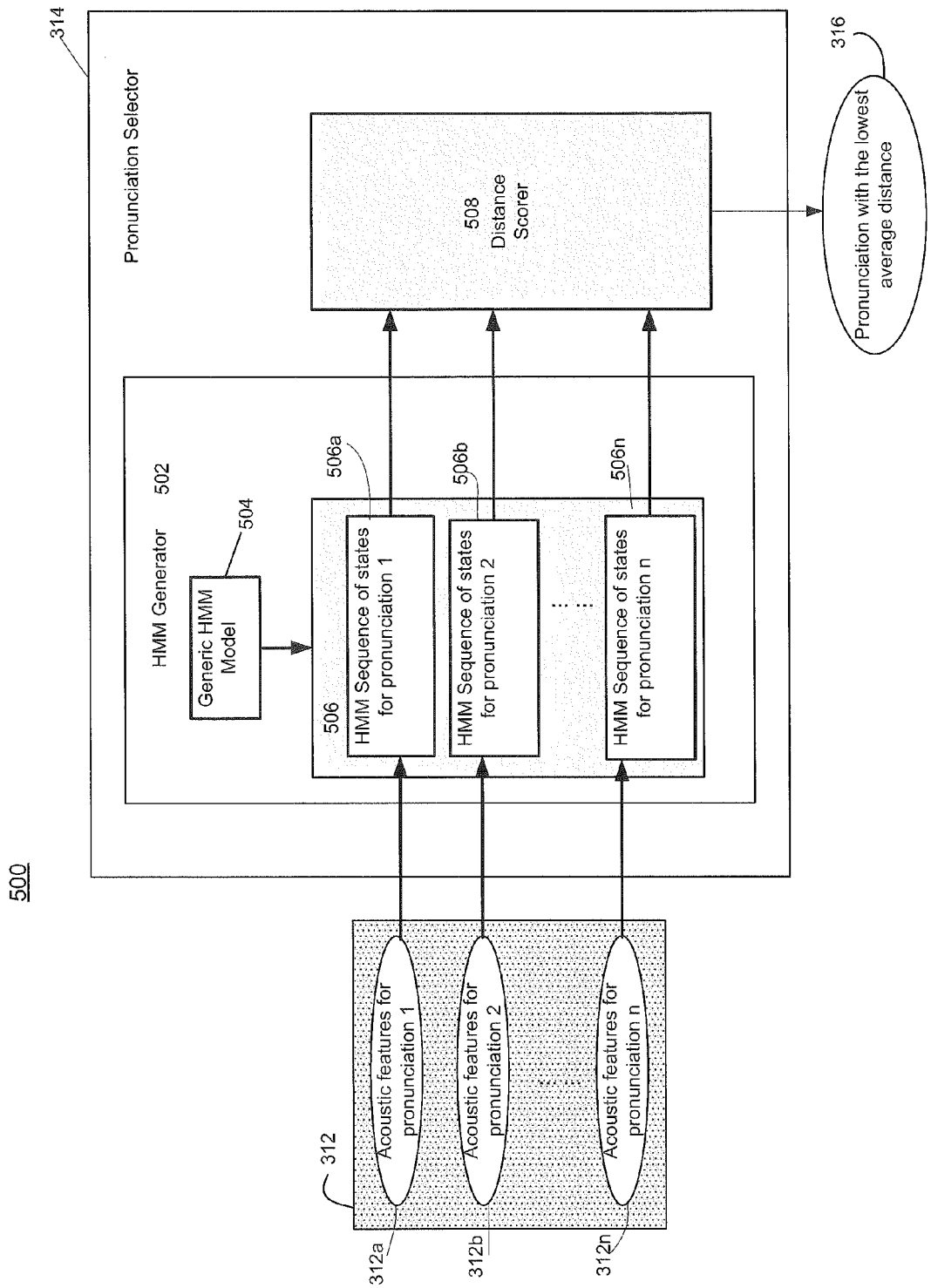
FIGS. 5A-B are functional diagrams in accordance with aspects of the invention.
Figure 5B:
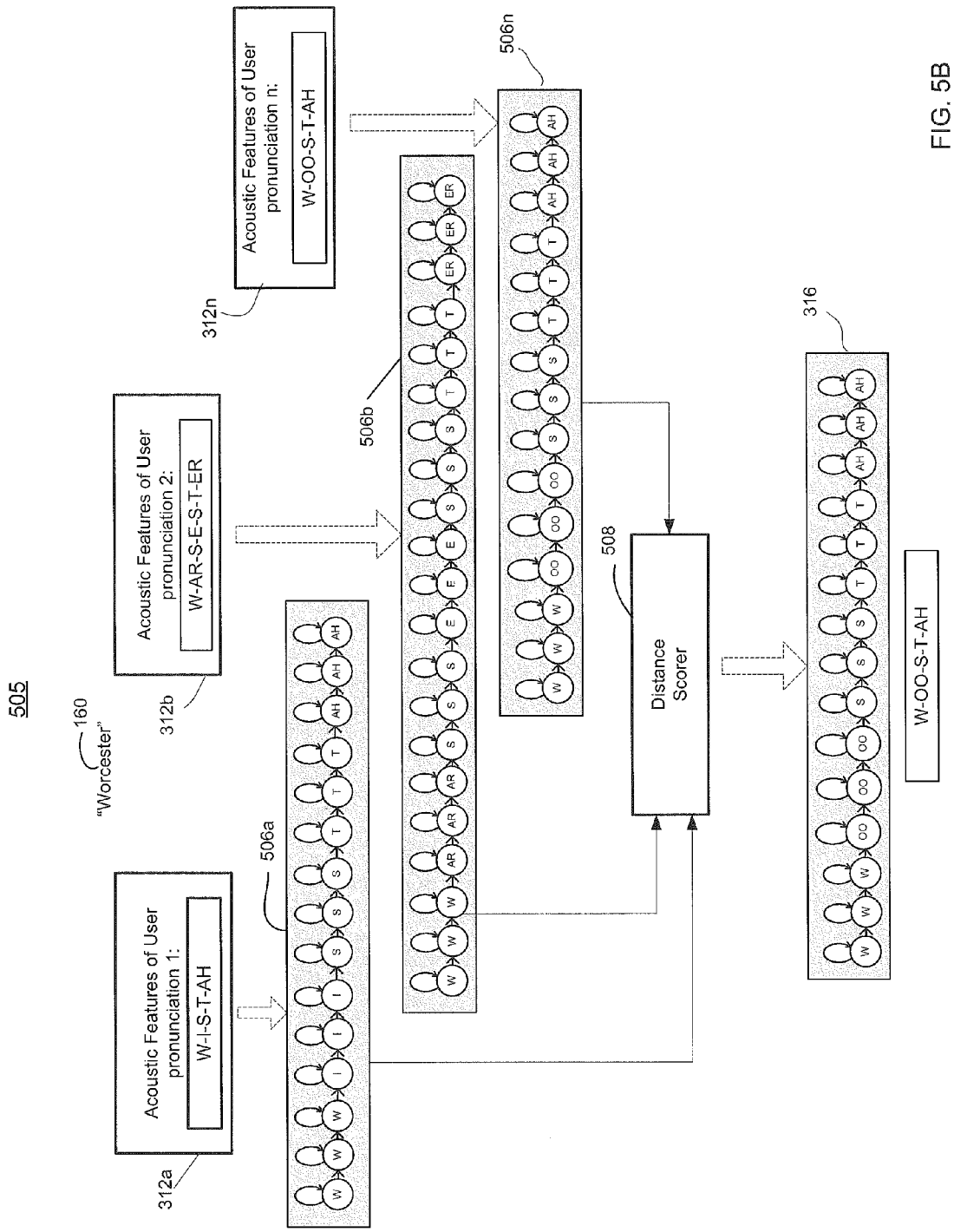

FIGS. 5A-B illustrate another embodiment of the invention. Here, the pronunciation selector 314 may include HMM generator 502 to generate HMM sequences 506a-506n respectively for each user pronunciation of a location name 312a-312n. In one example, each location name HMM sequence may be a sequence of concatenated phoneme HMMs. In another example, the location name HMM sequence may be a sequence of acoustic feature vectors. In yet another example, the location name HMM sequence may be based on other language units.

Then a distance scorer 508 compares the difference between one user pronunciation with another determined by calculating the distance between the two HMM sequences. In one example, a standard minimum-edit-distance or a Levenshtein distance may be calculated on phoneme level. For instance, the HMM sequence 506b can be transformed into the HMM sequence 506n by substituting one or more states in the 506a sequence by one or more states in the 506n sequence. The minimum edit distance is the minimum operations (such as substitution, insertion and/or deletions) needed to align the 506a sequence with the 506n sequence. Other edit-distance based measures may be used. For example, the basic edit-distance metric measurement may be optimized by using weighted coefficients to assign substitution costs for different phoneme segments or taking the overlaps between phonetic features into account in assigning weighted costs.

Other methods of measuring the distance between two pronunciations may be used. By way of example, each pronunciation may be represented as a histogram of predefined acoustic features codewords based on a predefined dictionary. Then the Kullback-Leibler (KL) divergence, or a symmetric version of the KL divergence may be used to compute the distance between the two histograms. The predefined dictionary of acoustic features codewords may be obtained by collecting a large set of pronunciation data, representing each pronunciation as a series of frames each representing acoustic features in a certain window, and clustering all the frames using Vector Quantization (VQ).

The scorer 508 may then repeat the process of calculating the distance between every HMM sequence with every other HMM sequence. For a given HMM sequence, the distances from every other sequence may be aggregated and averaged. Then a sequence that has the lowest average distance from all other sequences may be selected as having the most typical pronunciation. In one alternative, only one type of distance may be calculated and used to select the pronunciation. In another alternative, different types of distance may be calculated and be given the same weights to select the pronunciation. In a further alternative, different types of distance may be calculated and be given different weights to select the pronunciation.

Referring back to FIG. 3, the selected user-contributed pronunciation 316 may be added as an audible annotation of a location on a map. The speech data of the selected pronunciation may be stored in a database 318 associated with server 110 and be associated with the corresponding location name. When a user device makes a request to the server for an audio output of the location name, the server may retrieve the speech data and transmit it to the user device.

Figure 6:
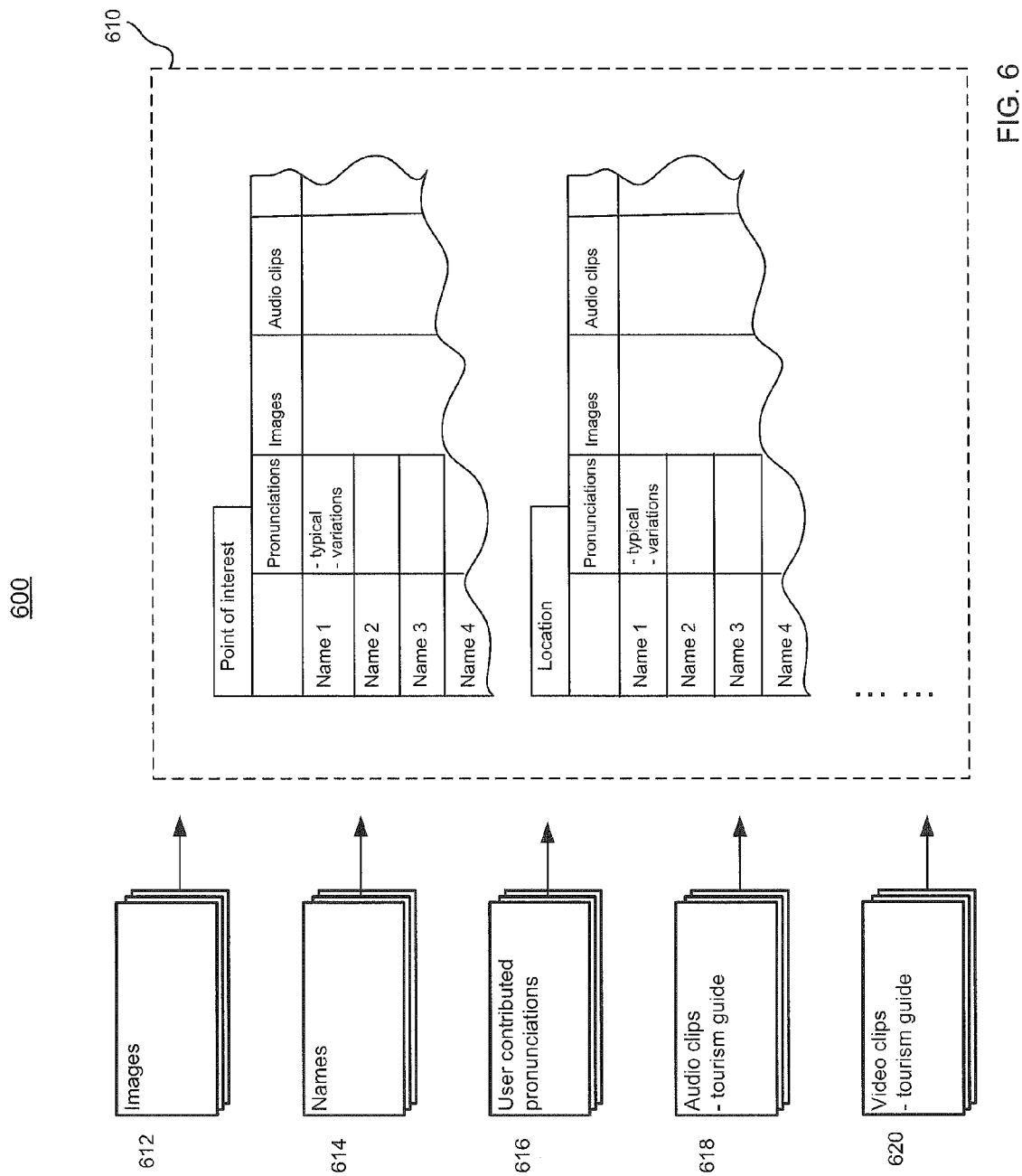
FIG. 6 is a functional diagram in accordance with aspects of the invention.

FIG. 6 shows that objects on a map application may be annotated with various types of user-contributed pronunciations or audio data. The users of the map applications may be provided with options to upload various types of audio data and options to hear the types of audio data associated with objects on the map. The audio data that may be associated with objects on a map may comprise pronunciations 616, audio clip files 618 or video clip files 620. the objects may include location names 614, e.g., the name of a city on a map, or images 612, e.g., a picture taken for a point of interest (such as a park or a museum).

After a most common pronunciation of the object is selected in accordance with aspects of the invention, the selected pronunciation may be designated as a "typical" pronunciation for the object in the database, as shown in FIG. 6. Other user pronunciations may then be selectively designated as variations of the typical pronunciation. The users of the map application may be provided with options to hear a typical pronunciation or a variant pronunciation.

A user of the map application may also be provided options to hear the pronunciations of an object when she clicks on an image of the object or when she clicks on or types in a text of the name of the object. An object on a map may be presented to the users in various visual forms, and the users may be able to hear the audio data associated with the objects independent of the visual forms.

It will be further understood that the sample values, types and configurations of data described and shown in the figures are for the purposes of illustration only. In that regard, systems and methods in accordance with aspects of the invention may include different speech processing techniques, speech model generation and adaptation systems, adaptation methods, data values, data types and configurations, etc. The systems and methods may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any system for selecting a typical user-contributed pronunciation from a plurality of candidate pronunciations may be used. By way of example, selected techniques may be used to generate a generic speech model of the location name, and other techniques may be used to adapt a generic model. Other techniques may also be used to measure the correlation level of one user pronunciation with another user pronunciation, or the correlation level of one user pronunciation with a reference speech model.

The invention claimed is:

1. A method of selecting a user spoken utterance, the method comprising:
  receiving, at a processing device, a set of user spoken utterances of a text string, each spoken utterance being a pronunciation of the text string by a corresponding different user and comprising a location name or a point of interest;
  generating, at the processing device, a speech model based on the text string and the set of received user spoken utterances from each corresponding user;
  comparing the generated speech model to each pronunciation received in the set of user spoken utterances;
  selecting a given one of the received user spoken utterances, as a most typical pronunciation of the text string, based on measured distance values between the speech model for the selected user spoken utterance and every other generated speech model, wherein selecting the given user spoken utterance based on the measured distance values includes identifying either:
  a sequence of modeling states from one user spoken utterance having a shortest average distance from other sequences for all other user spoken utterances in the plurality of user spoken utterances, or
  a sequence of modeling states from one user spoken utterance having a lowest average distance from other sequences for all other user spoken utterances in the plurality of user spoken utterances;
  annotating a mapping application with the selected pronunciation of the selected spoken utterance; and
  providing audio information of the selected user spoken utterance to a user device in response to selection of the location or point of interest by a user.

2. The method of claim 1, wherein generating a speech model based on the text string and the set of user spoken utterances further comprises obtaining a Hidden Markov Model of the text string.

3. The method of claim 2, wherein obtaining the Hidden Markov Model of the text string includes training a set of phoneme Hidden Markov Models with speech data.

4. The method of claim 1, wherein generating the speech model based on the text string and the user spoken utterances includes adapting a generic speech model based on the text string with the received set of user spoken utterances of the text string.

5. The method of claim 4, wherein adapting the generic speech model comprises adapting by Maximum A-Posteriori Estimation with the set of user spoken utterances of the text string.

6. The method of claim 4, wherein adapting the generic speech model comprises adapting by Maximum Likelihood Linear Regression with the set of user spoken utterances of the text string.

7. A method of selecting a user spoken utterance, comprising:
  receiving, at a processing device, a plurality of user spoken utterances of a text string, each user spoken utterance being a pronunciation of the text string by a corresponding different user and comprising a location name or a point of interest;
  the processing device generating a speech model for each received user spoken utterance from each corresponding user;
  the processing device measuring a distance value between each of the generated speech models and every other generated speech model;
  the processing device selecting a given one of the user spoken utterances, as a most typical pronunciation of the text string, based on the measured distance values between the speech model for the selected user spoken utterance and every other generated speech model, wherein selecting the given user spoken utterance based on the measured distance values includes identifying either:
  a sequence of modeling states from one user spoken utterance having a shortest average distance from other sequences for all other user spoken utterances in the plurality of user spoken utterances, or
  a sequence of modeling states from one user spoken utterance having a lowest average distance from other sequences for all other user spoken utterances in the plurality of user spoken utterances;
  annotating a mapping application with the selected user spoken utterance; and providing audible output of the text string based on the selected user spoken utterance in response to a user input.

8. The method of claim 7, wherein the generated speech models are Hidden Markov Models.

9. The method of claim 7, wherein the distance value is a minimum edit distance.

10. A method of providing audible output of a location name or a point of interest on an electronically generated map, the method comprising:
  receiving, at a processing device, a plurality of user spoken utterances of the location name or point of interest, each spoken utterance being a pronunciation of the location name or point of interest by a corresponding different user;
  the processing device selecting one of the user spoken utterances, as a most typical pronunciation of the text string, from the plurality of user spoken utterances based on acoustic features of the pronunciations of each of the plurality of user spoken utterances, the selection based on the acoustic features of the pronunciations including one or more of:
  a sequence of modeling states from one user spoken utterance having a shortest average distance from other sequences for all other user spoken utterances in the plurality of user spoken utterances, or
  a sequence of modeling states from one user spoken utterance having a lowest average distance from other sequences for all other user spoken utterances in the plurality of user spoken utterances;
  annotating the electronically generated map with the selected user spoken utterance; and
  providing audio output of the location name or point of interest to a user device based on the selected user spoken utterance.

11. The method of claim 10, wherein selecting one of the user spoken utterances comprises:

generating the speech model for each received user spoken utterance of the plurality of user spoken utterances; and measuring a distance value between each of the generated speech models and every other generated speech model;

wherein selecting one of the plurality of user spoken utterances is based on the measured distance values between the speech model for the selected user spoken utterance and every other generated speech model.

12. The method of claim 11, wherein the generated speech models are Hidden Markov Models.

13. The method of claim 11, wherein the distance value is a minimum edit distance.

14. The method of claim 10, wherein selecting one of the user spoken utterances comprises:

generating the speech model based on the location name and the plurality of user spoken utterances; and comparing the generated speech model to each of the plurality of user spoken utterances;

wherein selecting the user spoken utterance is based on a degree of similarity between the selected user spoken utterance and the generated speech model.

15. The method of claim 14, wherein generating the speech model comprises generating a Hidden Markov Model of the location name.

16. The method of claim 14, wherein generating the speech model comprises adapting a generic speech model of the location name by Maximum A-Posteriori Estimation or Maximum Likelihood Linear Regression with the plurality of user spoken utterances of the location name.

17. A server apparatus for providing audible data to a user device on a network, the server apparatus comprising:

a memory for storing information including map information; and a processor operatively coupled to the memory and being configured to:

receive a plurality of user spoken utterances of a location name or point of interest, each spoken utterance being a pronunciation of the location name or point of interest by a corresponding different user;

select one of the user spoken utterances from the plurality of user spoken utterances, as a most typical pronunciation of the text string, based on acoustic features of the pronunciations of each of the plurality of user spoken utterances, the selection based on the acoustic features of the pronunciations including one or more of:

a sequence of modeling states from one user spoken utterance having a shortest average distance from other sequences for all other user spoken utterances in the plurality of user spoken utterances, or a sequence of modeling states from one user spoken utterance having a lowest average distance from other sequences for all other user spoken utterances in the plurality of user spoken utterances;

annotate a computer generated map with the selected user spoken utterance; and provide audio output of the location name or point of interest to the user device based on the selected user spoken utterance.

18. The server apparatus of claim 17, wherein the processor is further configured to:

generate the speech model based on the location name and the plurality of user spoken utterances;

compare the generated speech model to each pronunciation in the plurality of user spoken utterances; and select one of the user spoken utterances based on a degree of similarity of the pronunciation of that user spoken utterance to the generated speech model.

19. The server apparatus of claim 18, wherein the generated speech model is a Hidden Markov Model.

20. The server apparatus of claim 18, wherein the processor is further configured to adapt a generic speech model based on the location name by Maximum A-Posteriori Estimation or Maximum Likelihood Linear Regression with the plurality of user spoken utterances of the location name.

21. The server apparatus of claim 17, wherein the processor is further configured to:

generate the speech model for each of the plurality of user spoken utterances; and measure a distance value between each of the generated speech models and every other generated speech model;

wherein the user spoken utterance is selected based on the measured distance values between the speech model for the selected user spoken utterance and every other generated speech model.

22. The server apparatus of claim 21, wherein the generated speech models are Hidden Markov Models.

23. The server apparatus of claim 21, wherein the distance value is a minimum edit distance.

24. The method of claim 4, further comprising, prior to adapting the generic speech model, normalizing the user spoken utterances and reducing a vocal tract length effect of the user spoken utterances.

25. The method of claim 1, further comprising designating one or more other ones of the received user spoken utterances as variations of the typical pronunciation.

* * * * *